United States Patent [19]

Emoto

[11] Patent Number: 4,922,694
[45] Date of Patent: May 8, 1990

[54] WHEELED SUPPORT FOR LINE TRIMMER

[76] Inventor: Clesson T. Emoto, 812 Kealahou St., Honolulu, Hi. 96825

[21] Appl. No.: 279,410

[22] Filed: Dec. 2, 1988

[51] Int. Cl.$^5$ .................. A01D 34/67; A01D 34/84; A01D 67/00
[52] U.S. Cl. .................................. 56/16.7; 56/12.7; 56/17.1; 56/17.2; 172/17
[58] Field of Search .............. 56/12.7, 16.7, 16.9, 56/17.1, 17.2, 17.5, 400.14; 172/13, 14, 15, 17; 280/47.17, 47.18, 47.2, 47.24, 47.19, DIG. 6

[56] References Cited

U.S. PATENT DOCUMENTS

| | | | |
|---|---|---|---|
| 2,608,043 | 8/1952 | Berdan | 172/17 |
| 2,721,433 | 10/1955 | Berdan | 56/25.4 |
| 2,812,950 | 11/1957 | Holloway | 280/42 |
| 2,932,526 | 4/1960 | Campbell | 280/42 |
| 3,587,749 | 6/1971 | Sauer | 172/17 |
| 4,182,100 | 1/1980 | Letter | 56/12.7 |
| 4,224,784 | 9/1980 | Hansen et al. | 56/12.7 |
| 4,389,836 | 6/1983 | Lowery et al. | 56/12.7 |
| 4,411,126 | 10/1983 | Lowry et al. | 56/12.7 |
| 4,428,183 | 1/1984 | Lowry et al. | 56/17.2 |
| 4,442,659 | 4/1984 | Enbusk | 56/12.7 |
| 4,512,143 | 4/1985 | Jimenez | 56/16.7 |
| 4,531,350 | 7/1985 | Huthmacher | 56/17.1 |
| 4,587,800 | 5/1986 | Jimenez | 56/16.7 |
| 4,688,376 | 8/1987 | Wolfe, Sr. | 56/12.7 |
| 4,704,849 | 11/1987 | Gilbert et al. | 56/16.7 |
| 4,712,363 | 12/1987 | Claborn | 56/12.7 |
| 4,735,425 | 4/1988 | Hoff | 240/47.18 |
| 4,796,415 | 1/1989 | Moore | 56/16.7 |
| 4,829,755 | 5/1989 | Nance | 56/17.1 |

Primary Examiner—Bruce M. Kisliuk
Attorney, Agent, or Firm—Martin E. Hsia

[57] ABSTRACT

A lightweight, 2-wheeled support for a line trimmer that allows the trimmer to be used as a wheeled lawnmower and a wheeled edger and that is adjustable for use with substantially all line trimmers.

18 Claims, 8 Drawing Sheets

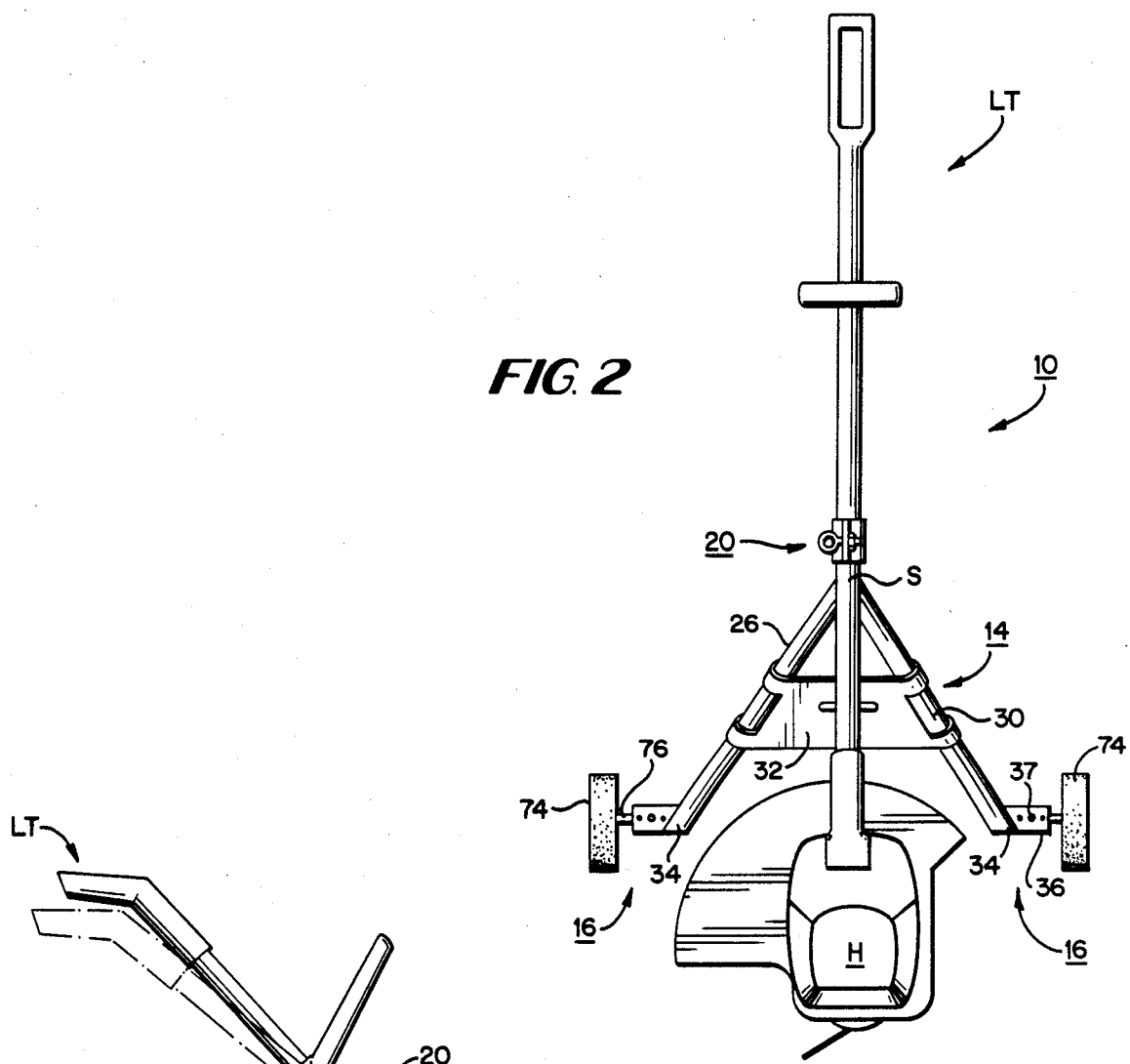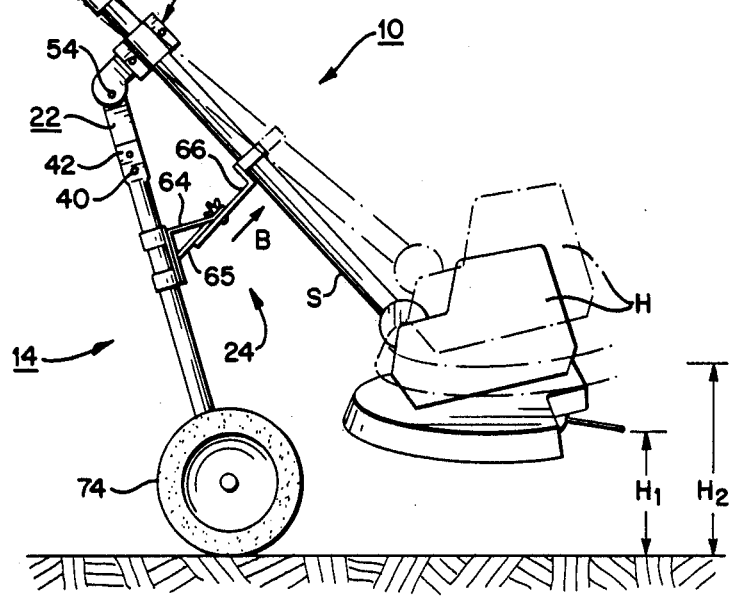

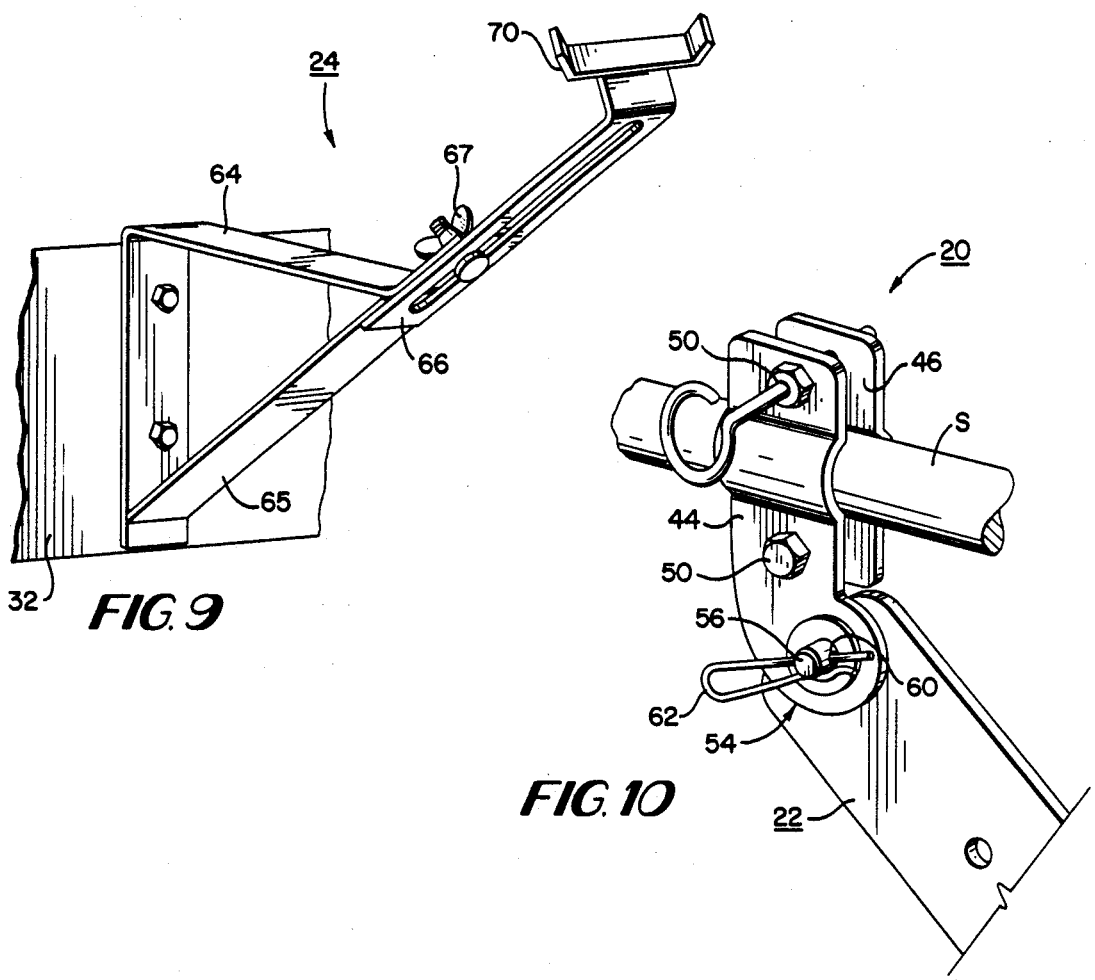
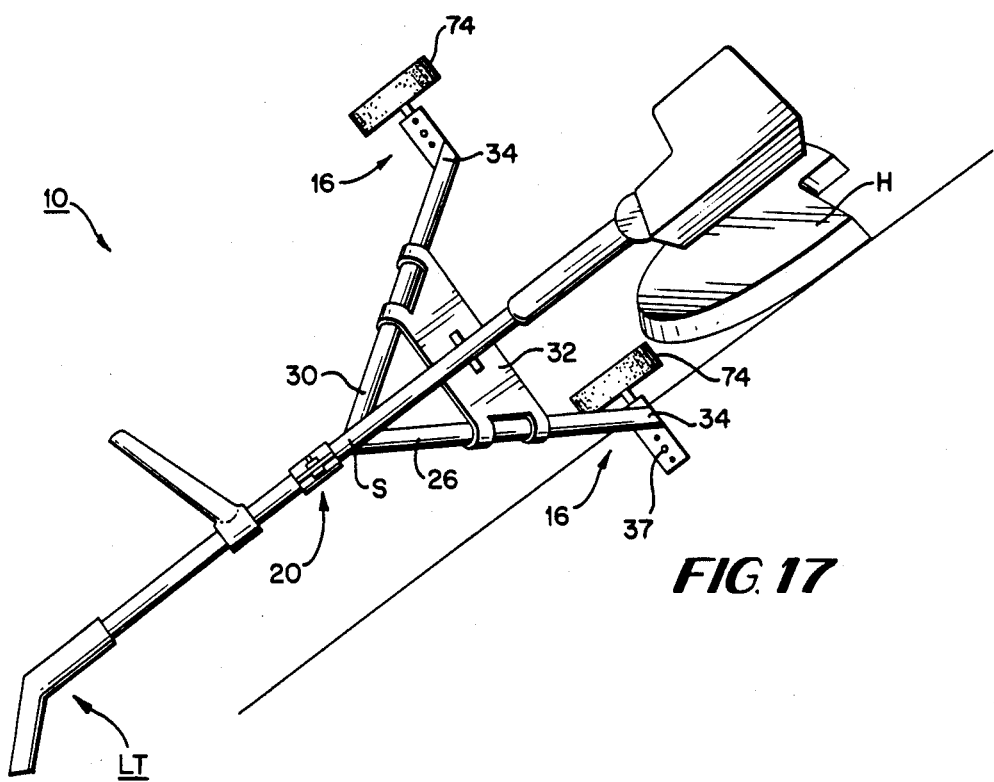

WHEELED SUPPORT FOR LINE TRIMMER

BACKGROUND OF THE INVENTION

This invention relates to a wheeled support for a line trimmer.

Line trimmers employing rapidly rotating filaments as cutting elements are used widely. A typical line trimmer comprises a power source (electric or gas driven), a rotating head and cable assembly and a shaft with a handle. The power source rapidly rotates the head and cable assembly which is attached to the shaft. The operator uses both hands to guide the rotating head and cable assembly to the desired trimming location. Such devices are useful for trimming in areas that usually are difficult to reach with a standard lawnmower. They are particularly attractive to homeowners with small yards because they can both trim and mow so that purchasing both a lawn mower and a trimmer is unnecessary. Furthermore, there is always the inconvenience of having to haul out a heavy lawnmower to do a little trimming work. However, using a trimmer as a lawnmower creates the problem of uneven cuts due to the difficulty of holding the trimmer at a constant horizontal level. The physical strain caused by the weight of the device also limits the amount of control the operator has over the trimmer.

Thus, there is a need for an attachable device for a line trimmer that will support the trimmer and therefore greatly reduce the amount of fatigue experienced by the user. There is also a need for a device that will enhance the degree of uniform trimming and control for the operator. Further, there is a need for providing some means to allow the trimmer to be used as an edger as well. Further, the means for supporting the trimmer and allowing use as an edger should be compact and lightweight for ease of use and storage.

U S. Pat. No. 4,224,784 to Hansen discloses a two wheeled device having an A-shaped frame for attachment to a line trimmer to convert it to an edger.

U.S. Pat. No. 4,182,100 to Letter discloses a three-wheeled frame for a line trimmer. The trimmer is attached to a pivotal handlebar and the trimmer boom is extended to the end of the frame. By applying pressure to the handlebars, the trimmer may be positioned to the desired cutting path.

U.S. Pat No. 4,428,183 to Lowry discloses a four-wheeled platform with a centrally located aperture for receiving and supporting the lower portion of a housing for a trimming device so that the cutting element of the device will extend beneath the platform and the motor housing will extend above the platform.

U.S. Pat. No. 4,442,659 to Enbusk discloses a trimmer supported on a dolly. The operator holds the dolly handle in one hand and the trimmer handle in the other hand. The trimmer is pivotally resting on the dolly whereby movement of the handle of the trimmer relative to that of the dolly handle will change the trimming path with respect to that of the dolly. Raising and lowering the trimmer handle in effect raises and lowers the trimmer s depth of cut.

U.S. Pat. No. 4,512,143 to Jimenez discloses a carriage for line trimmers comprising a frame resting on tubular runners which act like skids. The trimmer attaches to the frame and the skids provide a constant height above the ground thereby resulting in a uniform cut.

U.S. Pat. No. 4,531,350 to Huthmacher discloses a three-wheeled frame to support a line trimmer in the horizontal plane. A two-part detachable joint is used to release the trimmer from the wheeled assembly thereby permitting the user to hand manipulate the trimmer.

U.S. Pat. No.4,688,376 to Wolfe discloses a tubular frame shaped in a triangular configuration with three separate wheels supporting the vertices of the triangular frame. The triangular frame contains a central housing mechanism to hold the line trimmer at the desired trimming level.

U.S. Pat. No. 4,704,849 to Gilbert discloses a line trimmer supported by two 2-wheeled frames connected by a yoke. The yoke is made of two pieces which may pivot with respect to each other to allow insertion or removal of the trimmer handle. The yoke is pivotally mounted to the frame members to permit angular adjustment about the horizontal plane. Various mounting holes are provided in the frame members to permit further adjustment of the height of the Yoke.

U.S. Pat. No. 4,712,363 to Claborn disclose as a plate with wheels attached to the cutting mechanism of a line trimmer. The plate with wheels assembly acts as a support for the cutting mechanism of the line trimmer to provide a uniform cutting path.

In general, the devices disclosed in the patents described above are complex, cumbersome and lack versatility because they are adapted only for specific configurations of trimmers. The limitations of the four-wheeled assemblies would be the same as those of a four-wheeled lawn mower; trimming in areas adjacent to walls or corners would be difficult to achieve. Enbusk requires both hands to perform different oPerations and therefore is difficult to control. Jimenez uses runners to glide the trimmer over the ground and therefore requires a smooth surface with very little friction. Most of the devices only provide support for the line trimmer and do not allow conversion to an edger, but for those devices that can operate as both a trimmer and as an edger, Letter is bulky and cumbersome to operate and Hansen and Claborn make the entire assembly heavier while being used as a trimmer, yet do not provide support while being used as a trimmer.

Accordingly, the main objective of this invention is to provide a novel universal wheeled assembly that can be attached to a typical line trimmer to allow it to operate as either a wheeled trimmer or wheeled edger. A further object of this invention is to provide the versatility to accommodate the many different types of trimmers as well as this versatility of usage. A still further object is to provide for simplicity in operation as well as simplicity in production.

SUMMARY OF THE INVENTION

These and other objects are achieved by a 2-wheeled A-frame assembly pivotably attached to the shaft of a line trimmer at a pivot point and supported at a support point. The support provided by the invention reduces operator fatigue and increases trimmer control. The invention converts a hand-held line trimmer into a wheeled power lawnmower or edger, and provides support for the trimmer when it is used in any of the three modes of lawnmower, trimmer and edger.

Furthermore, the assembly can be easily disattached or removed from the trimmer, thus enabling the operator quickly to convert the trimmer back to the hand-held mode of operation if needed, for example, in areas where wheels are unable to perform, such as in very rocky terrain.

The invention also enables the operator to move the wheel assembly temporarily out of the way by pivoting the wheel assembly away and to the rear of the trimming head, thereby allowing for the convenience of trimming in close quarters.

The pivotal action will also allow for the automatic line feeding feature found on some line trimmers. This automatic line feeding feature allows the line to be spooled to the required length when more line is needed by the operator. The operator simply pivots the wheel assembly out of the way and thumps the trimmer head on the ground, thereby activating a spooling mechanism located on the bottom of the trimmer head. The spooling mechanism then automatically ejects more trimming filament.

At the pivot point, a clamp secures the upper shaft of the line trimmer to the apex of the A-framed structure and allows the shaft to rotate with respect to the A-frame. This allows the operator to convert from a line trimmer to an edger merely by rotating the shaft of the trimmer.

At the support point, an adjustable support brace projects from the crossbar of the A-frame and supports the lower portion of the line trimmer's shaft, thereby allowing the head of the trimmer to extend out from the A-frame. The height of the trimmer's cut can be varied by adjusting this support brace. The support brace also can be adjusted to allow for those trimmers with a large cutting radius.

The A-frame comprises lightweight tubular metal, plastic or the like. A height adjustment member is preferably attached to the apex of the A frame to vary the height of the line trimmer with respect to the ground as well as to adapt to line trimmers with different shaft lengths.

Two parallel wheels are attached to the base of the A-frame to allow for trimmer support and mobility. The wheels of the assembly are pivotally mounted so that they can be adjusted to operate at an angle, either both angling to the right or both angling to the left. This feature, together with rotating the line trimmer about its shaft, will allow the device to be used as an edger.

Other features and advantages of the invention will become apparent with reference to the accompanying drawings.

BRIEF DESCRIPTION OF THE DRAWINGS

A more complete understanding of the invention and its advantages will become more readily apparent from the detailed description below taken in conjunction with the accompanying drawings, in which:

FIG. 2 is a top plan view of the apparatus.

FIG. 5 is a right side view of the apparatus illustrating the function of the supporting bracket to vary the height of the line trimmer's head above the ground.

FIG. 9 is a close-up perspective view of the support brace of the apparatus.

FIG. 10 is a close-up perspective view of the adjustable collar and pivot for connection of the A-framed assembly.

FIG. 17 is a top plan view of the apparatus with a line trimmer in which the angle of the shaft can be adjusted so that the shaft is parallel to the cutting Plane. The trimmer is pivoted and the right wheel is rotated 180 degrees with respect to the A-frame, thereby illustrating its use as an edger.

DESCRIPTION OF A PREFERRED EMBODIMENT

Figure 1:
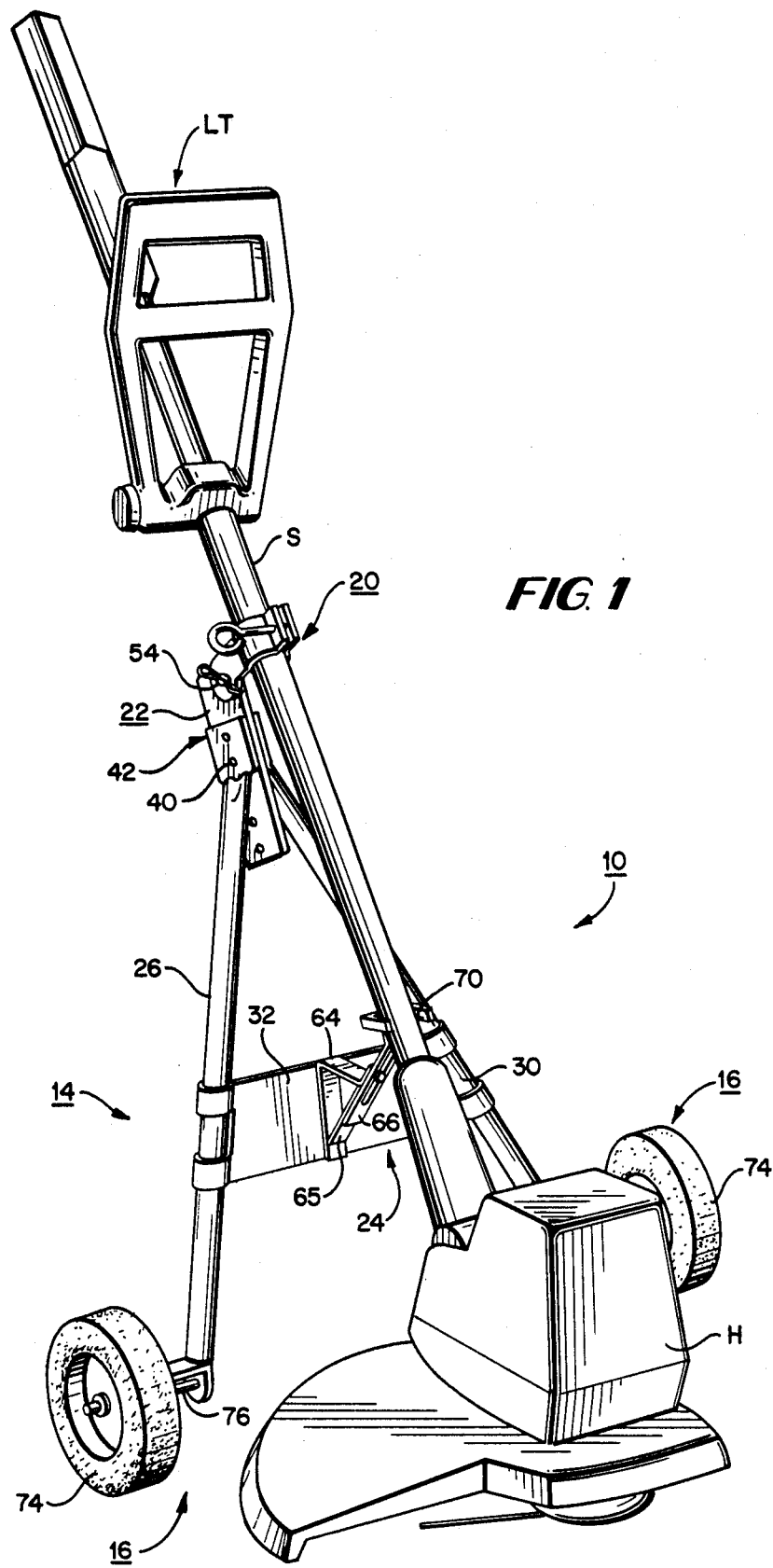
FIG. 1 is a perspective view of an apparatus in accordance with a preferred embodiment of this invention.

Referring initially to FIGS. 1 to 6 and 17, the apparatus 10 of a preferred embodiment of this invention comprises an A-frame 14, two parallel wheel assemblies 16 attached to the legs 26 and 30 of the A-frame 14, a height adjustment assembly 22 attached to the apex 42 of the A-frame 14, a supporting clamp assembly 20 attached to the height adjustment assembly 22, and a supporting brace assembly 24 attached to the crossbar 32 of the A-frame 14. When in use, the supporting clamp assembly 20 is clamped around the upper portion of the shaft S of a line trimmer LT, and the supporting brace assembly 24 abuts against the lower portion of the shaft S.

Figure 12:
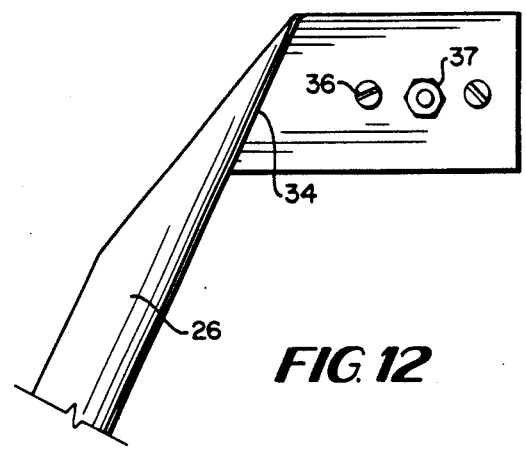
FIG. 12 is a top plan view of the case of the right leg of the A-framed structure.
Figure 13:
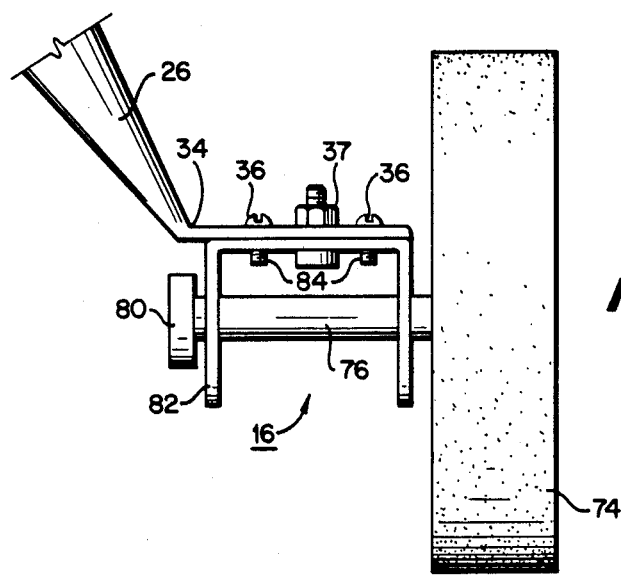
FIG. 13 is a rear elevational view of the assemblies shown in FIGS. 11 and 12.

Referring to FIGS. 1, 2, 6, 7 and 17, the A-frame 14 comprises a right leg 26, a left leg 30, and a crossbar 32. An outwardly angled bend 34 is made in the lower ends of the right leg 26 and the left leg 30. FIG. 12 shows a top view of a section of the right leg 26 with bend 34. Two set screws 36 with locking bolts 37, shown in FIGS. 12 and 13, are mounted on the lower sections of right leg 26 and left leg 30. The set screws 36 and locking bolts 37 are used to attach the wheel assemblies 16 to the A frame 14 (FIG. 13). The bends 34 allow the A-frame 14 to extend in the same longitudinal direction as that of the trimmer shaft S (FIG. 3) while still maintaining the wheel assemblies 16 in the upright position (FIG. 13). This bend 34 enables the wheel assembly 16 to remain upright even though it is rotated about the locking bolt 37. The operation will become more apparent when describing the apparatus as an edger.

An upwardly directed perforation 40, shown in FIG. 1, is made to the right leg 26 and left leg 30 of the upper section of the A-frame 14 thereby combining to form apex 42. The height adjustment assembly 22 (FIGS. 1, 3, 4, 5 and 10) is attached to the apex 42 of the A-frame which has the same effect as extending apex 42 above the ground, thereby accommodating trimmers with varying shaft lengths.

Figure 3:
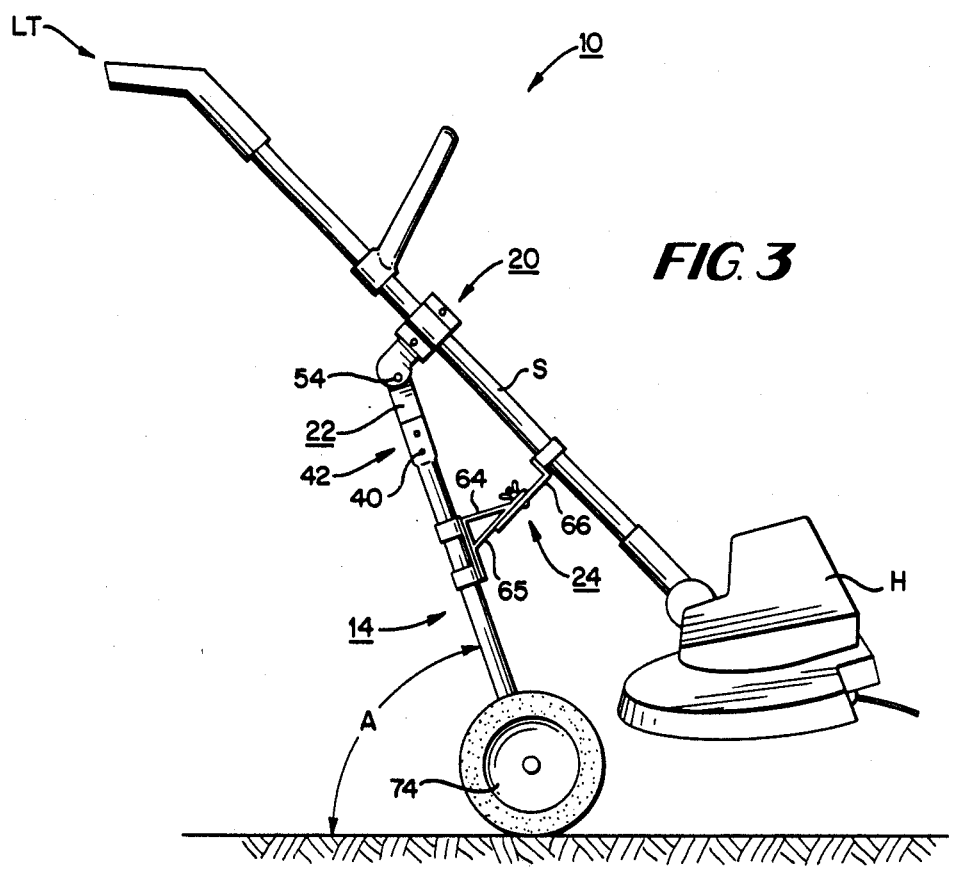
FIG. 3 is a right side view of the apparatus illustrating its use as a wheeled trimmer.
Figure 8:
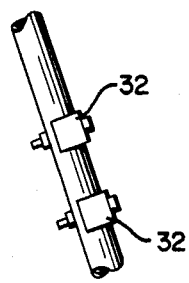
FIG. 8 is a close-up side view of the crossbar of FIG. 7.
Figure 7:
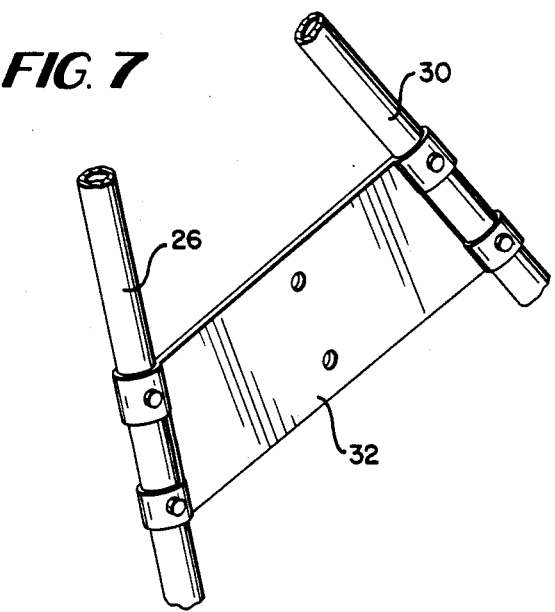
FIG. 7 is a close-up perspective view of the crossbar of the A-frame.

FIG. 7 shows the horizontal crossbar 32 attached to a section of the A-frame 14 while FIG. 8 shows a sectional side view of FIG. 7. FIG. 3 also shows an angle A made between the ground and the A-frame 14. Angle A can be adjusted by the operator to maintain the stability of the apparatus while being wheeled in the forward or reverse directions so that the apparatus does not accidentally swing towards the operator when going over a bump. Typically, angle A should be less than approximately 80 degrees. However, angle A can be adjusted to the angle preferred by the operator.

Figure 4:
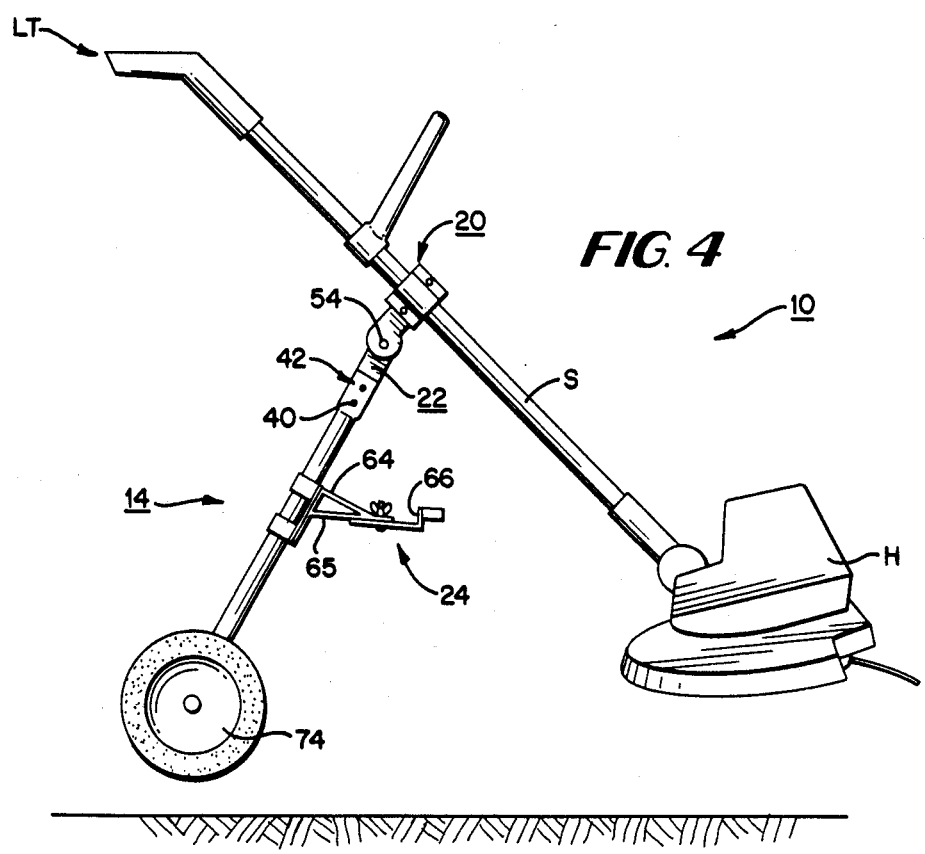
FIG. 4 is a right side view of the apparatus illustrating the pivoting of the A-frame for convenient usage in the hand-held mode of operation.

FIGS. 1 to 6 and 17 show the supporting clamp assembly 20 with a detailed drawing in FIG. 10. Referring to FIG. 10, the supporting collar 20 comprises a right component 44, a left component 46 and two securing bolts 50 to connect the assembly 20 to the upper section of the line trimmer shaft S. A pivotal connection 54 is also included on the supporting clamp assembly 20, comprising an axle 56 having a pin hole 60. A locking pin 62 is inserted into pin hole 60 to connect the supporting clamp assembly 20 to the height adjustment assembly 22 thereby allowing them to pivot with respect to each other. This ability to pivot enables the operator to convert conveniently from the wheeled trimmer shown in FIG. 3 to that of a functioning hand-held device as shown in FIG. 4. The operator may desire to convert to a hand-held device for close corners where the A-frame may be too large to allow the device to be maneuvered. The pivotal point will also accommodate those line trimmers with automatic line feeders activated by thumping. The thumping process involves the operator striking or thumping the head of the trimmer H or the ground to activate a mechanism on the bottom of trimmer's head H to spool the line out to the desired operating length.

Pin 62 also can be removed and axle 56 dislodged in order to allow the trimmer LT to be quickly and completely separated from the apparatus 10, thereby allowing operation as a typical hand-held trimmer.

FIGS. 1, 3, 4, 5 and 9 show the supporting brace assembly 24 attached to the horizontal crossbar 32. Referring to FIG. 9, the supporting brace assembly 24 comprises a crossbar projection member 64, an additional support brace 65, an adjustable sliding component 66, a wing nut assembly 67 and a U-shaped support 73. During operation, the lower section of the line trimmer shaft S will be seated on the U-shaped support 70, which will elevate the trimmer head H above the ground. By loosening the wing nut assembly 67, the adjustable sliding component 66 and thus the U-shaped support 70 can be adjusted to the desired trimming height. FIG. 5 shows the change in height of the trimmer head H from H1 to H2 by adjusting the sliding component 66 in direction B.

Figure 11:
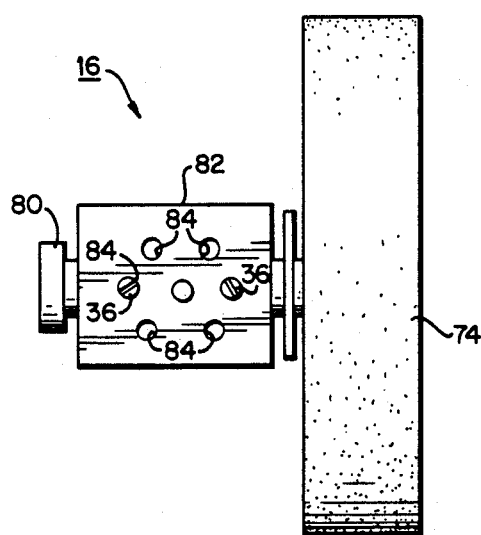
FIG. 11 is a top plan view of the wheel assembly.
Figure 14:
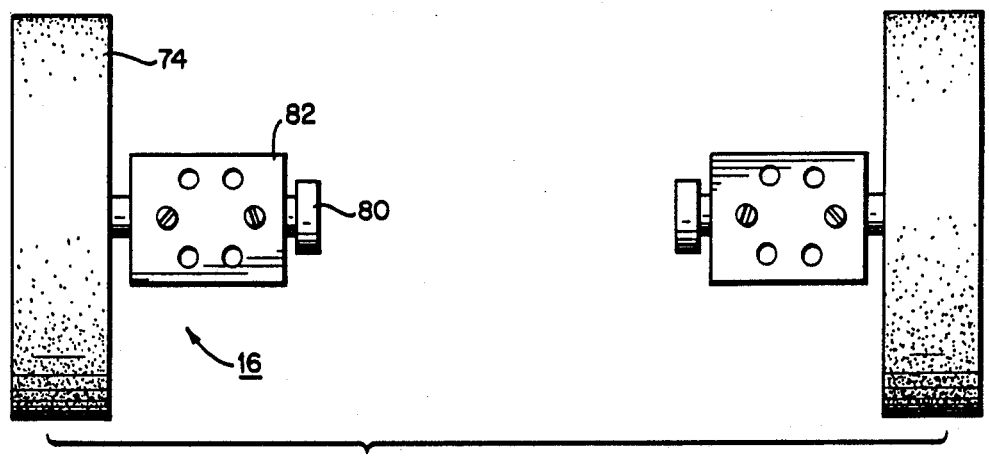
FIG. 14 is a top plan view of the wheel assemblies (with the A-frame and other structure omitted) illustrating use as a wheeled trimmer.
Figure 15:
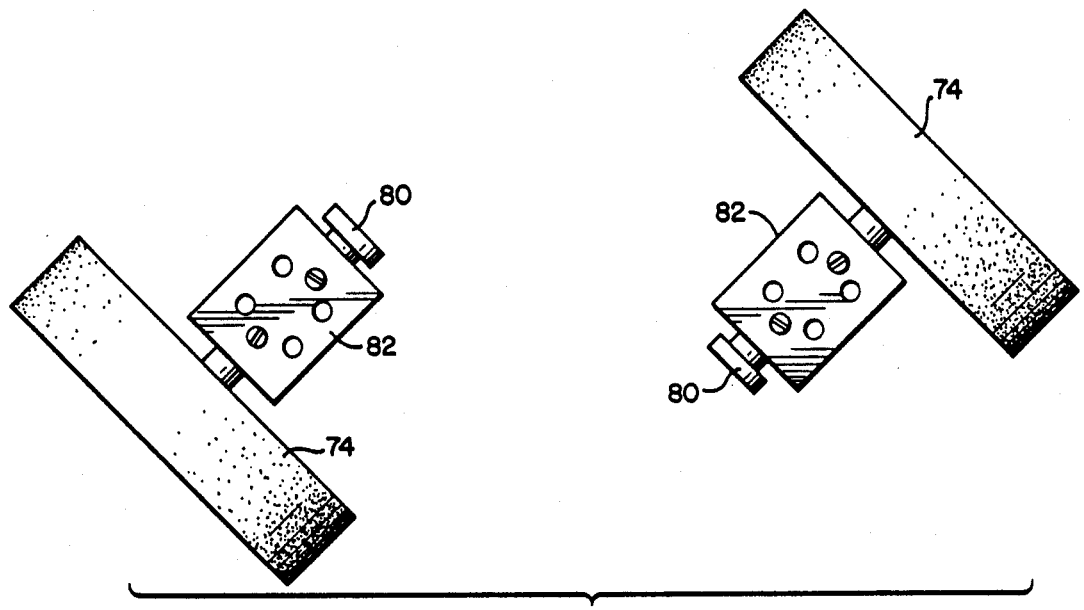
FIG. 15 is a top plan view of the wheel assemblies (with the A-frame and other structure omitted) angled to the left illustrating use as an edger.

FIG. 11 shows a top view of a wheel assembly 16 and FIG. 13 shows a rear view of a wheel assembly 16 and a section of the A-frame 14. Each wheel assembly 16 comprises a wheel 74, a wheel axle 76, a lock nut 80 and a supporting C-shaped frame 82. The C-shaped frame 82 and lock nut 80 retain the wheel 74 but still allow it to rotate freely about its axle 76. The frame 82 also includes adjustable slotted holes 84 that allow for the insertion of set screws 36 found on the A-frame 14. The C-shaped frame 82 and hence the slotted holes 84 can be rotated to the desired wheel direction where the set screws 36 will engage into the slotted holes 84 and then secured by the locking bolt 37. The wheel assembly 16 can either be positioned in the forward direction as shown in FIG. 14, angled to the left as shown in FIG. 15 or angled to the right as in FIG. 16.

In operation, the apparatus is completely adjustable. The supporting collar 20 can be adjusted longitudinally along the trimmer shaft S thereby accommodating line trimmers with varying shaft lengths. The height of the cutting plane of the trimmer can be lowered or raised by sliding the support collar 20 along shaft S either away from or towards the trimmer head H, respectively. The height adjustment assembly 22 also adds to the versatility of the device by allowing adjustment of the effective height of the A-frame's apex 42, thereby accommodating different types of line trimmers. Line trimmers with a larger cutting radius can be accommodated by extending the trimmer head H outwardly and away from the wheel assemblies 16. This can be accomplished by adjusting the sliding component 66 in direction B as shown in FIG. 5. Furthermore the height of the cutting plane can be raised or lowered by this same operational adjustment. The wheel assemblies 16 can be made to operate in the forward direction (FIG. 14).

The operator can adjust the trimmer head H to the desired cutting height and, with the apparatus as shown in FIG. 3, wheel the device to the trimming location. The operator also can pivot the wheel assemblies 16 away from the trimmer head H (FIG. 4), thereby having the convenience of using the apparatus as a hand-held trimmer.

Figure 6:
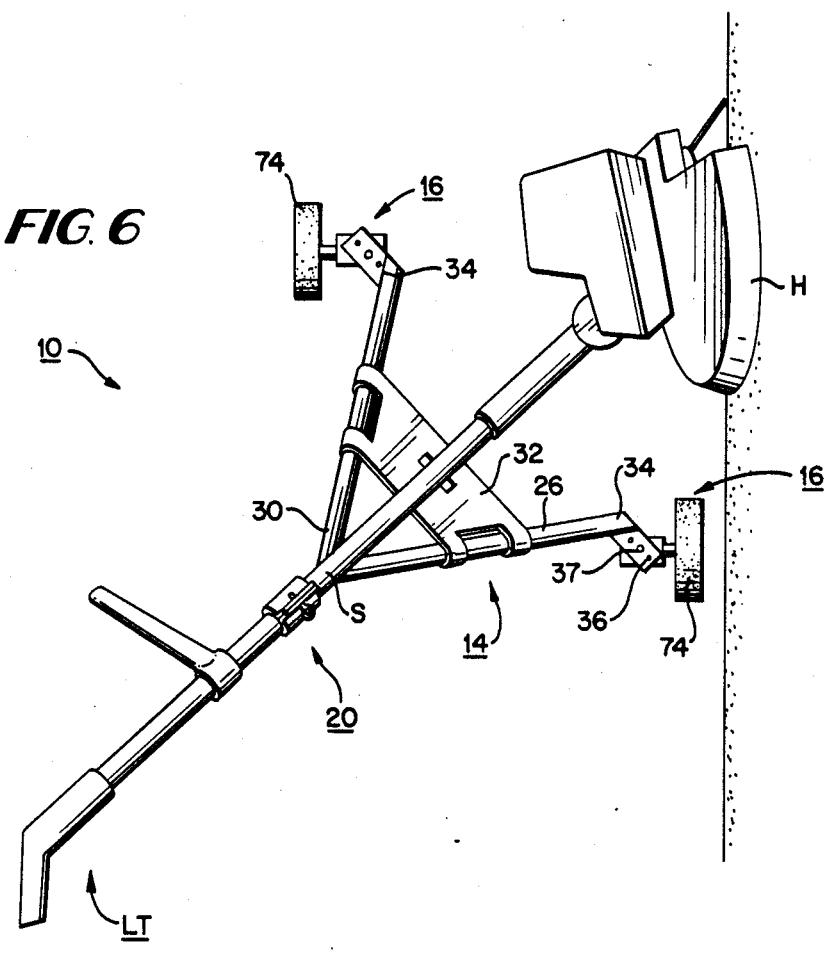
FIG. 6 is a top plan view of the apparatus with the trimmer pivoted and the wheels angled to the left illustrating its use as an edger.
Figure 16:
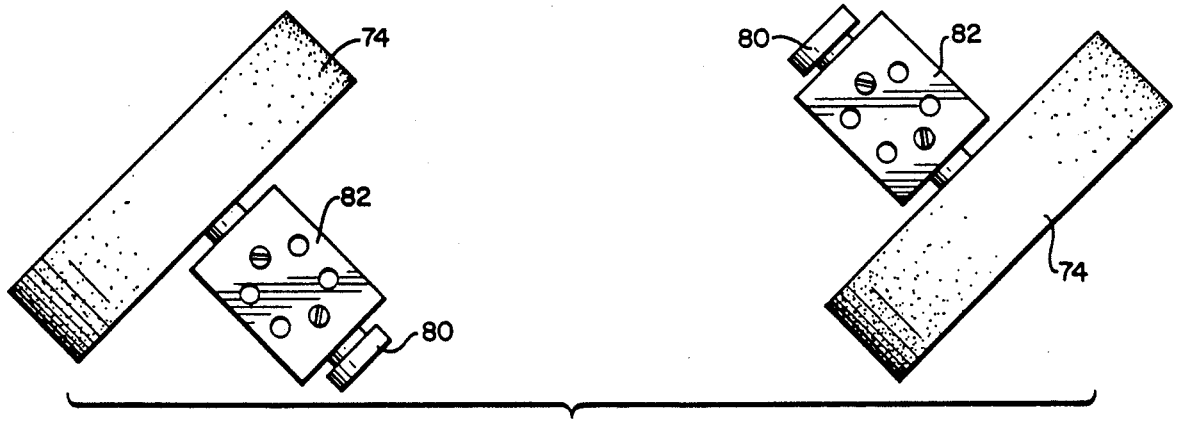
FIG. 16 is a top plan view of the wheel assemblies (with the A-frame and other structure omitted) angled to the right illustrating its use as an edger.

By rotating the line trimmer LT on its side and using the supporting collar 20 to secure the device in that position, the wheeled apparatus 10 can be made to operate as an edger. Both wheeled assemblies 16 can rotate with respect to the A-frame 14, thereby causing the cutting plane of the trimmer head H to rotate parallel with that of the wheel direction. FIG. 6 shows the line trimmer LT rotated on its left side with the wheel assemblies 16 angled to the left (FIG. 15); therefore the area to be edged would be on the right side of apparatus 10. To edge those areas on the left side of the apparatus 10, the line trimmer LT can be rotated on its right side with the wheel assemblies 16 angled to the right (FIG. 16). To adjust the wheel position, the wheel assembly 16 can be uncoupled from the A-frame 14 by loosening the locking bolt 37 and rotating the wheel assembly 16 to the desired slotted position 84 on the C-shaped frame 82. When set screws 36 engage in the desired slotted holes 84, the wheel assembly can be recoupled to the A-frame 14 by tightening locking bolt 37.

Figure 18:
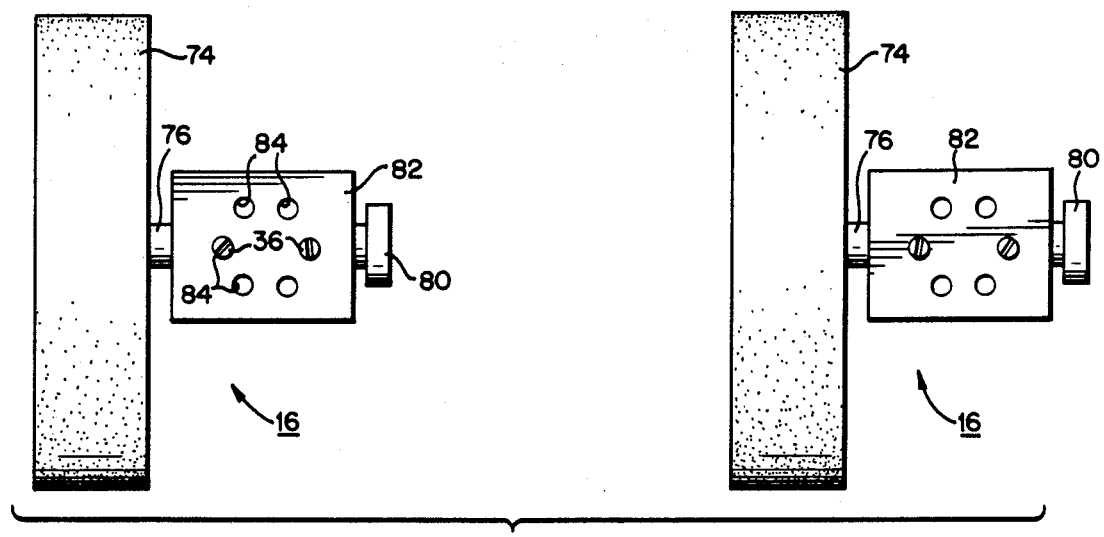
FIG. 18 is a top plan view of the wheel assemblies (with the A-frame and other structure omitted) of the right wheel rotated 180 degrees illustrating its use as an edger as in FIG. 17.
Figure 19:
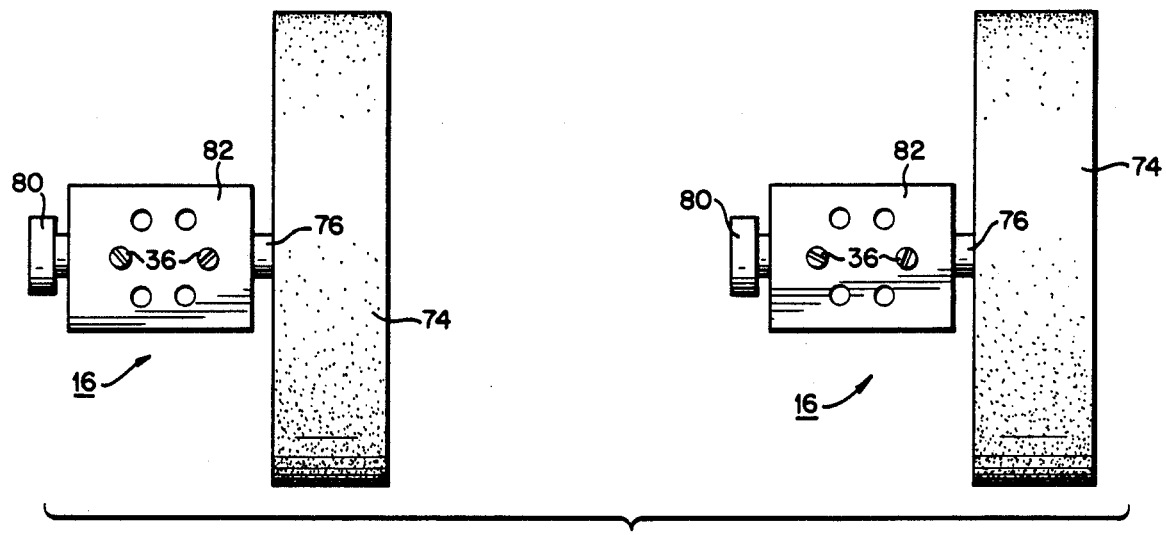
FIG. 19 is a top plan view of the wheel assemblies (with the A frame and other structure omitted) of the left wheel rotated 180 degrees illustrating its use as an edger.

If the angle between the shaft S of the line trimmer LT and the head H of the line trimmer LT can be adjusted so that the shaft S is parallel to the cutting plane of the line trimmer LT, the wheeled apparatus 10 can be made to operate as an edger with the wheels 16 parallel to the shaft S (as shown in FIG. 17), rather than with the wheels 16 at an angle with respect to the shaft 5 (as shown in FIG. 6). In this configuration, only one of the wheel assemblies 16 needs to be rotated in converting the line trimmer LT to an edger. FIG. 17 shows the line trimmer LT rotated on its left side with the right wheel assembly 16 rotated 180 degrees (FIG. 18); therefore the area to be edged would be on the right side of the apparatus 10. To edge those areas on the left side of the apparatus 10, the line trimmer LT can be rotated on its right side with the left wheel assembly 16 rotated 180 degrees (FIG. 19). To adjust the position of the wheels, either wheel assembly 16 can be uncoupled from the A-frame 14 by loosening the locking bolt 37 and rotating the wheel assembly 16 to the desired slotted holes 84 in the C-shaped frame 82. When set screws 36 engage in the desired slotted holes 84 the wheel assembly 16 can be recoupled to the A-frame 14 bY tightening locking bolt 37.

It will be appreciated that the apparatus 10 of a preferred embodiment of this invention is simple in design, light in weight, easy to operate and inexpensive to manufacture.

This invention has been described above in connection with a particular preferred embodiment and modifications and changes from the disclosed apparatus may be made without departing from the spirit and scope of the invention. Accordingly, no limitations are to one inferred or implied except as set forth in the appended claims.

What is claimed is:

1. A support for a line trimmer having a shaft with an upper portion and a lower portion, comprising:
   a substantially planar substantially A-shaped frame having two legs, an apex and a crossbar;
   two wheels, each attached to one of the legs of said A-shaped frame;
   clamping means for clamping said A-shaped frame to the upper portion of the shaft of said line trimmer, mounted on the apex of said A-shaped frame; and
   supporting means for supporting the lower portion of the shaft of said line trimmer, attached to the crossbar of said A-shaped frame.

2. A support as described in claim 1, wherein said clamping means comprises:
   a shaft clamp mounted on the apex of said A-shaped frame.

3. A support, as described in claim 2, wherein said supporting means comprises a shaft support bracket attached to the crossbar of said A-shaped frame.

4. A support as described in claim 3, wherein:
   said shaft clamp releasably clamps said shaft, whereby said shaft clamp may be released, said shaft may be rotated, and said shaft clamp may be re-clamped, whereby said line trimmer may be used as an edger.

5. A support, as described in claim 4, wherein:
   said shaft clamp comprises:
   a first collar member having a substantially C-shaped portion and first and second securing bolt apertures;
   a second collar member having a substantially C-shaped portion and first and second securing bolt apertures;
   a first securing bolt extending through said first securing bolt apertures in said first and second collar members; and
   a second securing bolt extending through said second securing bolt apertures in said first and second collar members, whereby said first collar member and said second collar member are secured together.

6. A support, as described in claim 4, wherein:
   said shaft clamp is pivotably mounted on the apex of said A-shaped frame, whereby the angle between said shaft and a plane parallel to and passing through said A-shaped frame can be adjusted.

7. A support as described in claim 4, further comprising:
   a height adjustment assembly mounted between the apex of said A-shaped frame and said shaft clamp.

8. A support as described in claim 7, wherein:
   said height adjustment assembly comprises:
   an apex member having a plurality of first screw apertures attached to said legs at said apex;
   a clamp member having a plurality of second screw apertures attached to said clamp; and
   a screw projecting through one of said first screw apertures and one of said second screw apertures detachably attaching said clamp member to said apex member.

9. A support as described in claim 4, further comprising:
   an adjustable length support member mounted between said crossbar and said shaft support bracket, whereby the distance between said crossbar and said shaft support bracket can be adjusted.

10. A support as described in claim 9, wherein:
    said adjustable length support member comprises:
    a crossbar projection member attached to said crossbar and projecting out of a plane parallel to and passing through said A-shaped frame;
    an additional support brace having two ends attached at one end to said crossbar and attached at the other end to said crossbar projection member; and
    an elongated bracket holding member slidably attached to said crossbar projection member at one end and attached to said shaft support bracket at the other end.

11. A support as described in claim 4, wherein:
    said wheels are adjustably pivotably attached to said legs, whereby the axis of rotation of said wheels can be adjusted to pivot out of a plane parallel to and passing through said A-shaped frame.

12. A support as described in claim 4, wherein said crossbar comprises:
    a substantially trapezoidal plate having attachment projections projecting from each vertex, each attachment projection having an attachment bolt aperture, wherein the non-parallel sides of said substantially trapezoidal plate abut against the legs of said A-shaped frame and the parallel sides of said substantially trapezoidal plate span across the legs of said A-shaped frame; and
    four attachment bolts, each projecting through one of said attachment bolt apertures into one of said legs of said A-shaped frame, thereby attaching said attachment projections to said legs of said A-shaped frame.

13. A wheeled line trimmer and edger having a shaft with an upper portion and a lower portion, comprising:
    a substantially planar substantially A-shaped frame having two legs, an apex and a crossbar;
    a wheel attached to each of the legs of said A-shaped frame;
    a shaft clamp adapted for clamping to the shaft of said line trimmer mounted on the apex of said A-shaped frame;
    a shaft support bracket adapted for supporting the shaft of a line trimmer attached to the crossbar of said A-shaped frame; and a line trimmer having the upper portion of its shaft clamped in said shaft clamp and having the lower portion of its shaft supported by said shaft support bracket.

14. A wheeled line trimmer and edger, as described in claim 13, wherein:
    said shaft clamp releasably clamps said shaft, whereby said shaft clamp may be released, said shaft may be rotated, and said shaft clamp may be re-clamped, whereby said line trimmer may be used as an edger.

15. A wheeled line trimmer and edger, as described in claim 14, wherein:
    said shaft clamp is pivotably mounted on the apex of said A-shaped frame, whereby the angle between said shaft and a plane parallel to and passing through said A-shaped frame can be adjusted.

16. A wheeled line trimmer and edger, as described in claim 14, further comprising:
    a height adjustment assembly mounted between the apex of said A-shaped frame and said shaft clamp.

17. A wheeled line trimmer and edger, as described in claim 14, further comprising:
    an adjustable length support member mounted between said crossbar and said shaft support bracket, whereby the distance between said crossbar and said shaft support bracket can be adjusted.

18. A wheeled line trimmer and edger, as described in claim 14, wherein:
    said wheels are adjustably pivotably attached to said legs, whereby the axis of rotation of said wheels can be adjusted to pivot out of a plane parallel to and passing through said A-shaped frame.

* * * * *